United States Patent
Schulze et al.

(10) Patent No.: US 9,567,901 B2
(45) Date of Patent: Feb. 14, 2017

(54) INTERNAL COMBUSTION ENGINE AND CONNECTING ROD

(71) Applicants: Hilite Germany GmbH, Marktheidenfeld (DE); Dr.-Ing. h.c. F. Porsche AG, Stuttgart (DE)

(72) Inventors: Dietmar Schulze, Muenzenberg (DE); Michael Paul, Weissach (DE)

(73) Assignees: Hilite Germany GmbH, Marktheidenfeld (DE); Dr.-Ing. h.c. F. Porsche AG, Stuttgart (DE)

(*) Notice: Subject to any disclaimer, the term of this patent is extended or adjusted under 35 U.S.C. 154(b) by 143 days.

(21) Appl. No.: 14/293,477

(22) Filed: Jun. 2, 2014

(65) Prior Publication Data

US 2015/0059683 A1   Mar. 5, 2015

(30) Foreign Application Priority Data

Aug. 27, 2013   (DE) .................. 10 2013 014 090

(51) Int. Cl.
*F02B 75/32*   (2006.01)
*F02B 75/04*   (2006.01)
*F02F 7/00*   (2006.01)

(52) U.S. Cl.
CPC ............ *F02B 75/045* (2013.01); *F02B 75/32* (2013.01); *F02F 7/0043* (2013.01)

(58) Field of Classification Search
CPC ....... F02B 75/044; F02B 75/045; F02B 75/32; F02D 15/02; F16C 7/06
USPC .. 123/48 A, 48 B, 41.37, 78 E, 197.4, 197.3
See application file for complete search history.

(56) References Cited

U.S. PATENT DOCUMENTS

| | | | | |
|---|---|---|---|---|
| 2,151,853 A | * | 3/1939 | Jonville | ............... F02B 75/045 123/78 BA |
| 6,247,430 B1 | | 6/2001 | Yapici | |
| 7,434,548 B2 | * | 10/2008 | Takahashi | ............ F02B 75/044 123/48 B |
| 7,469,663 B1 | | 12/2008 | Berger | |

(Continued)

FOREIGN PATENT DOCUMENTS

| | | |
|---|---|---|
| DE | 10255299 A1 | 6/2004 |
| DE | 102005055199 A1 * | 5/2007 ............ F02B 75/045 |

(Continued)

*Primary Examiner* — Marguerite McMahon
*Assistant Examiner* — Tea Holbrook
(74) *Attorney, Agent, or Firm* — Von Rohrscheidt Patents

(57) ABSTRACT

An internal combustion engine with adjustable compression ratio with a connecting rod bearing eye for connecting to a piston of at least one cylinder and an eccentrical element adjustment device for adjusting an effective connecting rod length, and wherein the eccentrical element adjustment device includes an eccentrical element cooperating with an eccentrical element lever and eccentrical element rods engaging the eccentrical element lever, wherein the eccentrical element rods are loaded with a hydraulic pressure that is provided in hydraulic cavities interacting with the eccentrical element rods, wherein the eccentrical element lever includes at least one eccentrical element lever segment, wherein the at least one eccentrical element lever segment is positioned in axial direction of the eccentrical element in front and/or behind the connecting rod bearing eye, and wherein the at least one eccentrical element lever segment is fixated at the eccentrical element.

17 Claims, 7 Drawing Sheets

(56) References Cited

U.S. PATENT DOCUMENTS

| | | | |
|---|---|---|---|
| 7,527,026 B1 * | 5/2009 | Berger | F02B 75/045 123/48 B |
| 7,533,638 B1 * | 5/2009 | Berger | F02B 75/045 123/48 B |
| 7,685,974 B2 * | 3/2010 | Berger | F02B 75/045 123/48 B |
| 2003/0075125 A1 * | 4/2003 | Kreuter | F02B 75/048 123/78 BA |
| 2003/0209219 A1 | 11/2003 | Klomp et al. | |
| 2010/0012095 A1 | 1/2010 | Wilkins | |
| 2014/0014070 A1 * | 1/2014 | Lee | F02B 75/047 123/48 B |
| 2014/0020660 A1 * | 1/2014 | Lee | F02B 75/045 123/48 B |

FOREIGN PATENT DOCUMENTS

| | | | |
|---|---|---|---|
| DE | 102010016037 A1 | 5/2007 | |
| DE | 102010061361 A1 * | 4/2012 | F02D 15/02 |
| DE | 102011002138 | 10/2012 | |
| DE | 102012014917 A1 * | 2/2013 | F02B 75/045 |
| DE | 102011056298 A1 * | 6/2013 | F02B 75/045 |
| DE | 102013021065 A1 * | 6/2015 | F02B 75/045 |
| EP | 1424486 | 6/2004 | |
| JP | 2004124848 A | 4/2004 | |
| JP | 2014164512 | 9/2014 | |
| WO | WO2010108582 A1 | 9/2010 | |
| WO | WO 2015074649 A1 * | 5/2015 | F02B 75/045 |

* cited by examiner

INTERNAL COMBUSTION ENGINE AND CONNECTING ROD

RELATED APPLICATIONS

This application claims priority from German patent application DE 10 2013 014 090.0 filed on Aug. 27, 2013 which is incorporated in its entirety by this reference.

FIELD OF THE INVENTION

The invention relates to an internal combustion and a connecting rod for the internal combustion engine.

BACKGROUND OF THE INVENTION

FIG. 1 illustrates a detail of an internal combustion engine known from DE 10 2010 016 037 A1 with an adjustable compression ratio in a portion of a connecting rod. Thus FIG. 1 illustrates a connecting rod 10 which includes a crank pin bearing eye 11 and a connecting rod bearing eye 12 wherein the crank pin bearing eye 11 connects the connecting rod 10 to a crank shaft that is not illustrated in FIG. 1 and the connecting rod bearing eye 12 connects the connecting rod 10 to a cylinder piston of an internal combustion engine that is not illustrated in FIG. 1. An eccentrical element adjustment device 13 is associated with the connecting rod 10 wherein the eccentrical element adjustment device includes an eccentrical element that is not shown in FIG. 1 and an eccentrical element lever 14 and eccentrical element rods 15, 16.

The eccentrical element lever 14 includes a bore hole that is arranged eccentrical relative to a center 17 of the connecting rod bearing eye 12 with a center 18, wherein the bore hole in the eccentrical element lever 14 receives the eccentrical element and a bore hole in the eccentrical element receives a piston pin. The eccentrical element adjustment device 13 is used for adjusting an effective connecting rod length $l_{eff}$, wherein a distance of the center 18 of the bore hole in that eccentrical element lever 14 from a center 19 of the crank pin bearing eye 11 is defined as connecting rod length. In order to rotate the eccentrical element 14 and thus to change the effective connecting rod length $l_{eff}$ the eccentrical rods 15, 16 of the eccentrical element adjustment device 13 are moveable. A piston 20, 21 is associated with each eccentrical element rod 15, 16, wherein the pistons are respectively moveably supported in a hydraulic cavity 20, 23. A hydraulic pressure is provided in the hydraulic cavities 20, 23, wherein the hydraulic pressure impacts the pistons 20, 21 associated with the eccentrical element rods 15, 16, wherein moving the eccentrical element rods 15, 16 is possible or not possible as a function of an oil volume in the hydraulic cavities 22, 23.

The adjustment of the eccentrical element adjustment device 13 is initiated through impact of mass and load forces of the internal combustion engine which impact the eccentrical element adjustment device 13 during an operating cycle of the internal combustion engine. During an operating cycle the effective directions of forces impacting the eccentrical element adjustment device 13 change continuously. The adjustment movement is supported by the pistons 20, 21 that are loaded with hydraulic fluid and which impact the eccentrical element rods 15, 16, wherein the pistons 20, 21 prevent a reset of the eccentrical element adjustment device 13 based on various effective directions of the forces impacting the eccentrical element adjustment device 13.

The eccentrical element rods 15, 16 which interact with the pistons 20, 21 are connected on both sides with the eccentrical element 14. The hydraulic cavities 22 and 23 in which the pistons 20, 21 are supported are loadable with hydraulic oil through hydraulic oil conduits 24 and 25 from the crank pin bearing eye 11. Check valves 26 and 27 prevent a flow back of the hydraulic oil from the hydraulic cavities 23 and 24 back into the hydraulic conduits 24, 25. In a bore hole 28 of the connecting rod 10 a switch valve 29 is received whose function is already known from DE 10 2010 016 037 A1, wherein the switching position of the switch valve 29 determines which of the hydraulic cavities 22 and 23 is filled with hydraulic oil and which of the hydraulic cavities 22 and 23 is emptied, wherein this determines the adjustment direction or direction of rotation of the eccentrical element adjustment device. The hydraulic cavities 22 and 23 and thus are in contact with the bore hole 28 through fluid conduits 30 or 31 which are received by the switch valve 29. FIG. 1 schematically illustrates an actuation device 32, a spring device 33 and a control piston 34 of the switch valve 29, wherein the function of the components of the switch valve 29 is already known from DE 10 2010 016 037A1.

As stated supra the hydraulic oil which impacts the pistons 20, 21 supported in the hydraulic cavities 22, 23 is supplied to the hydraulic cavities 22, 23 starting from the crank pin bearing eye 11 through hydraulic conduits 24, 25, wherein the connecting rod 10 engages the crank pin bearing eye 11 at the crank shaft not illustrated in FIG. 1, so that a connecting rod bearing 35 shell is arranged between a crank shaft bearing pin of the crank shaft and the crank pin bearing eye.

DE 10 2005 055199 A1 illustrates further details of a combustion engine with adjustable compression ratio wherein it is known from this document to insert the eccentrical element lever, at which the eccentrical element rods engage, into a slot shaped recess in the connecting rod bearing eye. For mounting purposes the eccentrical element lever which includes a bore hole with inner teething is inserted into a slot shaped recess of the connecting rod bearing eye, wherein the eccentrical element which has external teething is subsequently inserted into the bore hole of the eccentrical element lever. The eccentrical element and the eccentrical element lever are connected with one another through teethings engaging one another. Connecting the eccentrical element with the eccentrical element lever through the teethings engaging one another causes a high level of production and assembly complexity and is therefore subject to wear.

BRIEF SUMMARY OF THE INVENTION

It is an object of the invention to provide a novel internal combustion engine and a novel connecting rod which overcome the disadvantages of the prior art.

The object is achieved through an internal combustion engine with adjustable compression ratio with at least one cylinder and with a crank shaft at which at least one connecting rod engages, wherein the at least one connecting rod includes a crank bearing eye for connecting to the crank shaft, a connecting rod bearing eye for connecting to a piston of the at least one cylinder and an eccentrical element adjustment device for adjusting an effective connecting rod length, and wherein the eccentrical element adjustment device includes an eccentrical element cooperating with an eccentrical element lever and eccentrical element rods engaging the eccentrical element lever, wherein the eccentrical element rods are loaded with a hydraulic pressure that is provided in hydraulic cavities interacting with the eccentrical element rods, wherein the eccentrical element lever includes at least one eccentrical element lever segment, wherein the at least one eccentrical element lever segment is positioned in axial direction of the eccentrical element in front and/or behind the connecting rod bearing eye, and wherein the at least one eccentrical element lever segment is fixated at the eccentrical element.

According to the invention the eccentrical element lever includes at least one eccentrical element lever segment, wherein the eccentrical element lever segment or each eccentrical element segment is positioned in axial direction of the eccentrical element in front and/or behind the connecting rod bearing eye and wherein the eccentrical element lever segment or each eccentrical element lever segment is fixated at the eccentrical element.

Through the present invention it is possible for the first time to fixate the eccentrical element at the eccentrical element lever segment or at each eccentrical element lever segment of the eccentrical element lever and to omit teethings at the eccentrical element and at the eccentrical element lever. This helps to reduce production and assembly complexity as well as propensity to wear.

Advantageously the eccentrical element lever includes two eccentrical element lever segments, wherein a first eccentrical element lever segment is positioned in axial direction of the eccentrical element in front of the connecting rod bearing eye and a second eccentrical element lever segment is positioned in axial direction of the eccentrical element behind the connecting rod bearing eye, so that the connecting rod bearing eye is positioned between the two eccentrical element lever segments. When the eccentrical element includes two eccentrical element lever segments between which the connecting rod bearing eye is positioned a particularly advantageous displacement of the eccentrical element lever is feasible when adjusting the effective connecting rod length.

According to an advantageous embodiment of the invention the eccentrical element has an outer contour with a shoulder wherein the shoulder limits an insertion depth of the eccentrical element into the eccentrical element lever. The shoulder at the eccentrical element simplifies assembly.

According to an advantageous embodiment of the invention the eccentrical element lever segment or each eccentrical element lever segment of the eccentrical element lever is welded together with the eccentrical element. Connecting the eccentrical element lever segment or each eccentrical element lever segment of the eccentrical element lever with the eccentrical element through welding is particularly simple and insensitive to wear.

The connecting rod according to the invention is configured with an eccentrical element adjustment device for adjusting an effective connecting rod length, wherein an eccentrical element adjustment device includes an eccentrical element cooperating with an eccentrical element lever and eccentrical element rods engaging the eccentrical element lever, wherein the eccentrical element lever includes at least one eccentrical element lever segment, wherein the at least one eccentrical element lever segment is positioned in axial direction of the eccentrical element in front and/or behind the connecting rod bearing eye, and wherein the at least one eccentrical element lever segment is fixated at the eccentrical element.

BRIEF DESCRIPTION OF THE DRAWINGS

Advantageous embodiments of the invention can be derived from the dependent claims and from the subsequent description. Embodiments of the invention are described with reference to the drawing figure without being limited thereto, wherein:

DETAILED DESCRIPTION OF THE INVENTION

Figure 1:
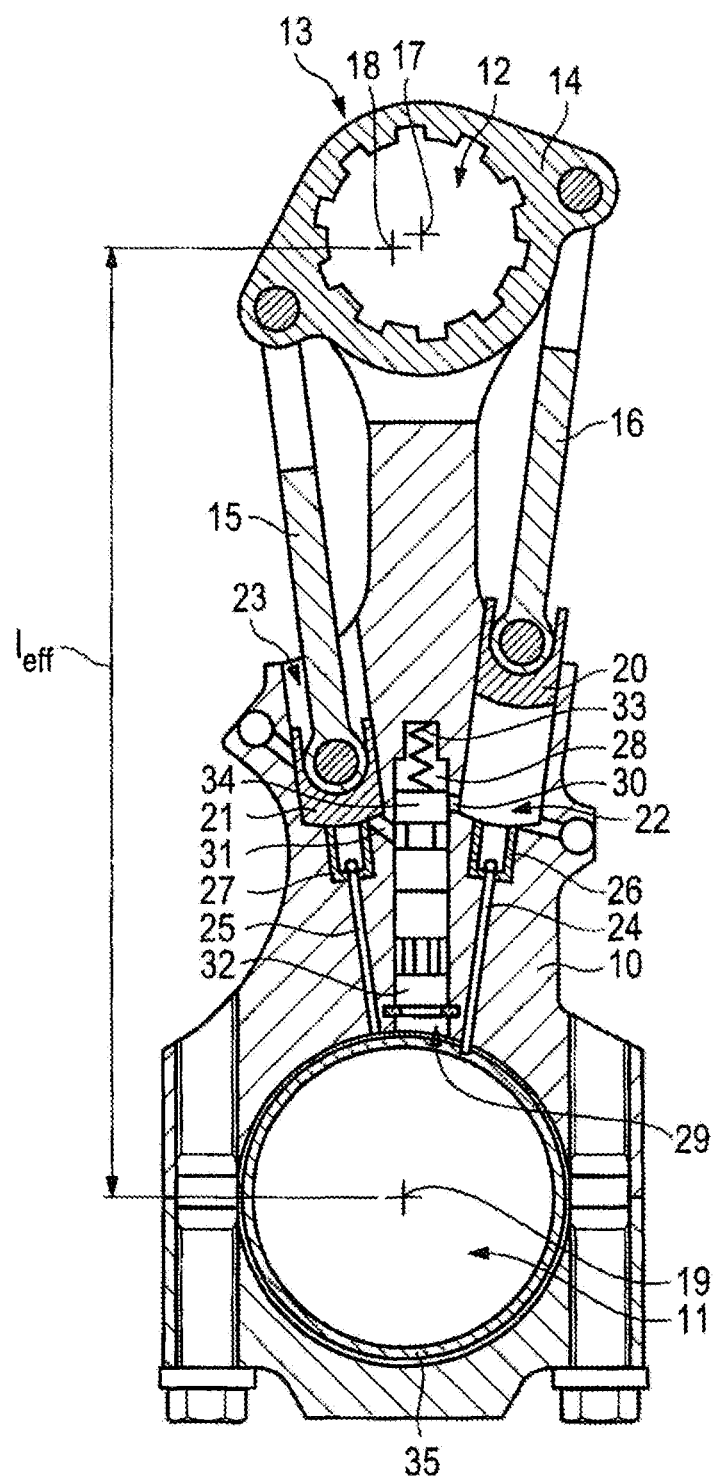
FIG. 1 illustrates a detail of an internal combustion engine with adjustable compression ratio that is known in the art.

An internal combustion engine with an adjustable compression ratio includes at least one, advantageously plural cylinders. Each cylinder includes a piston which is coupled through a connecting rod 10 to a crank shaft of the internal combustion engine. Each connecting rod 10 includes a connecting rod bearing eye 12 at one end and a crank pin bearing eye 11 at an opposite end. The respective connecting rod 10 engages a crank shaft bearing pin of the crank shaft with its crank pin bearing eye 11 so that a connecting rod bearing shell is positioned between the crank shaft bearing pin and the crank pin bearing eye, wherein a lubrication oil film can be established between the connecting rod bearing shell and the crank shaft bearing pin.

An internal combustion engine with an adjustable compression ratio includes an eccentrical element adjustment device 13 in a portion of each connecting rod 10 in order to adjust the effective connecting rod length of the respective connecting rod 10. The eccentrical element adjustment device 13 includes an eccentrical element 36, an eccentrical element lever 14 and eccentrical element rods 15, 16 which are moveable for adjusting the compression ratio as a function of hydraulic pressure provided in hydraulic cavities interacting with the eccentrical element rods. The hydraulic cavities cooperating with the eccentrical element rods 14, 15 are supplyable with hydraulic fluid starting from the crank pin bearing eye 11 of the respective connecting rod. The adjustment of the eccentrical element adjustment device is initiated through an impact of mass and load forces of the internal combustion engine.

Figure 2:
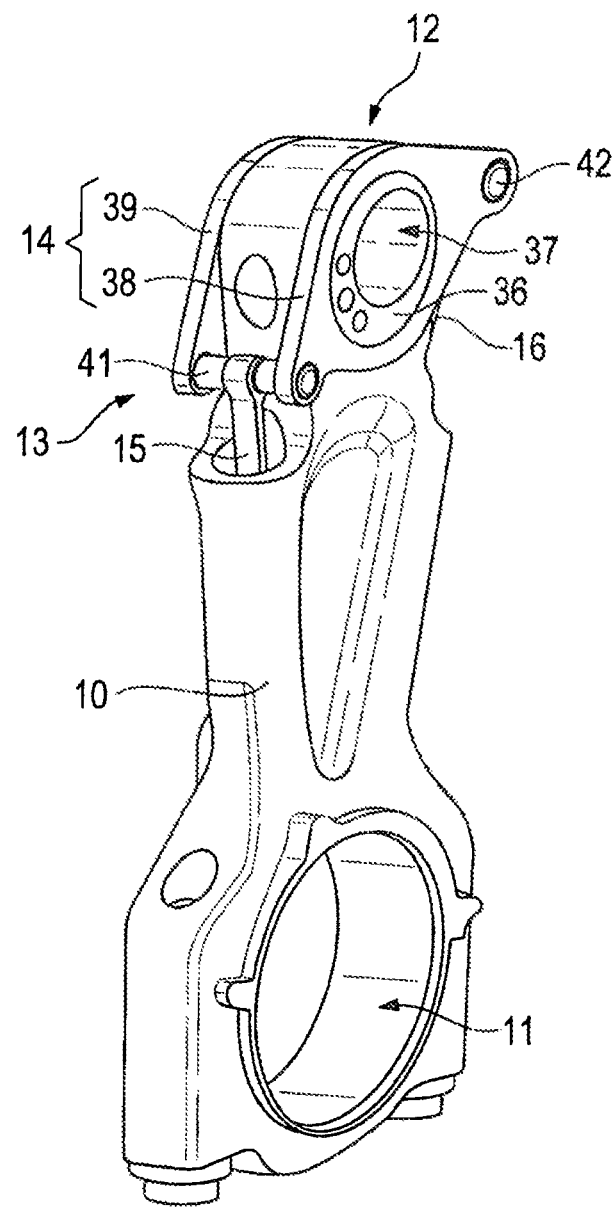
FIG. 2 illustrates a detail of a internal combustion engine according to the invention with an adjustable compression ratio.

The eccentrical element lever 14 includes a bore hole for receiving the eccentrical element 36 wherein the eccentrical element 36 includes a bore hole 37 which is used for receiving the piston pin. The eccentrical element lever 14 includes at least one eccentrical element lever segment, in the embodiment of FIGS. 1-5 two eccentrical element lever segments 38, 39 wherein one respective eccentrical element lever segment 38, 39 is positioned in axial direction of the eccentrical element 36 on both sides of the connecting rod bearing eye 12 in front and behind of the connecting rod bearing eye. Thus, the connecting rod bearing eye 12 is arranged between the two eccentrical element lever segments 38, 39 of the eccentrical element lever 14 as apparent from FIG. 2.

Figure 3:
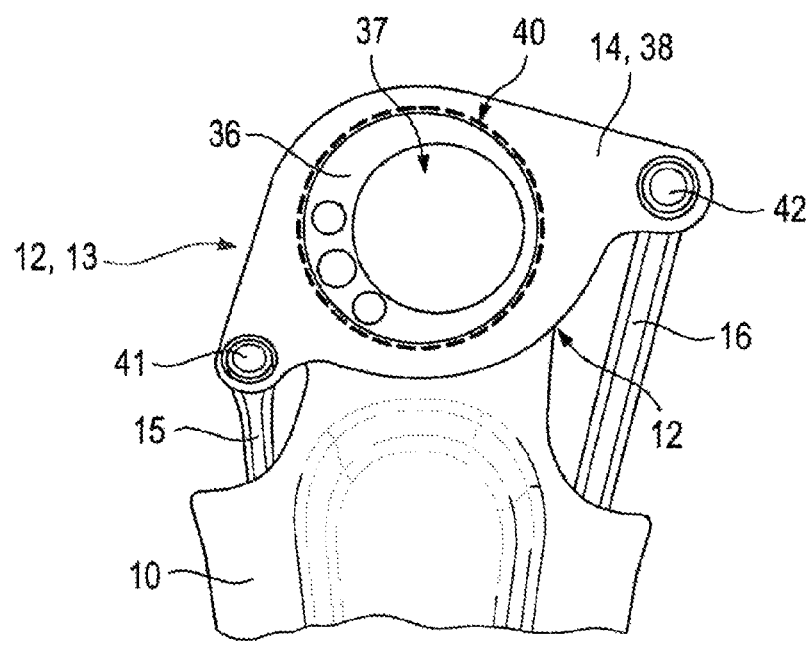
FIG. 3 illustrates a detail of FIG. 2.
Figure 4:
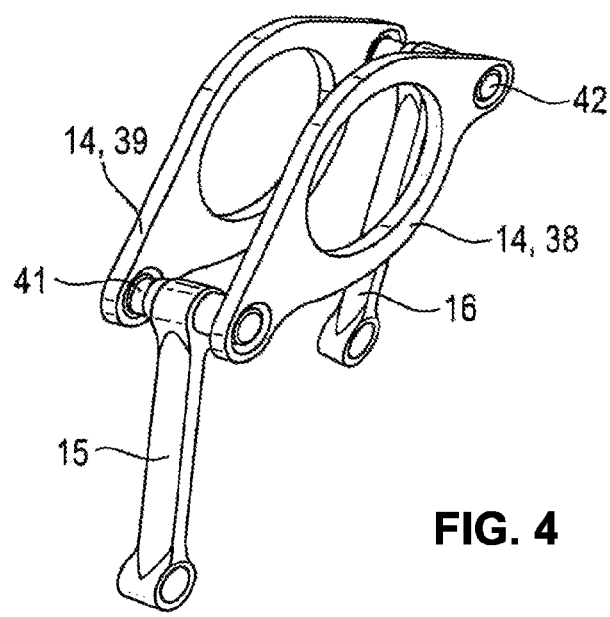
FIG. 4 illustrates another detail of FIG. 2.
Figure 5:
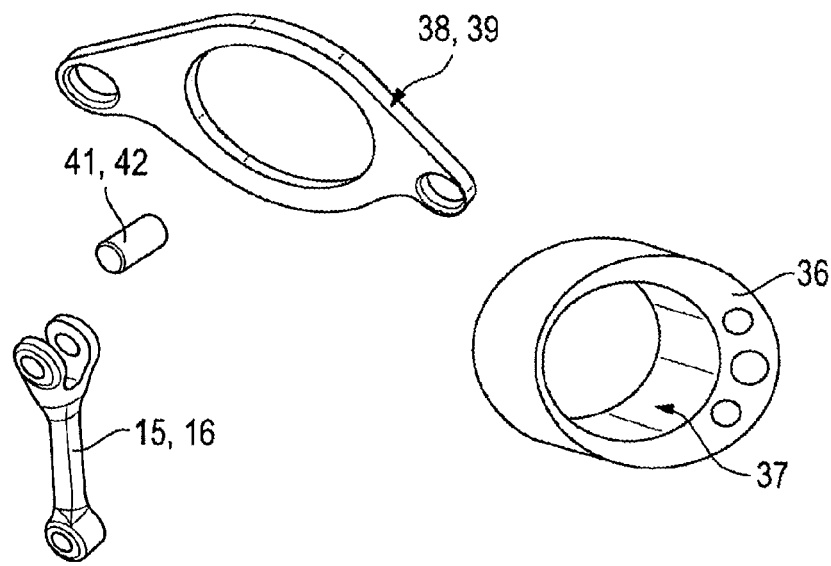
FIG. 5 illustrates subassemblies according to FIG. 4 in an exploded view.

The eccentrical element lever segments of the eccentrical element lever 14 are fixated at the eccentrical element 36 wherein FIG. 3 illustrates a connecting portion 40 in dashed lines that is circumferential in circumferential direction of the eccentrical element 36 wherein the connecting portion is illustrated between the visible eccentrical element lever segment 38 and the eccentrical element 36.

Advantageously the eccentrical element 36 and the eccentrical element lever segment 38 of the eccentrical element lever 14 are fixated at one another through welding in this connecting portion 40. Subsequently as illustrated in the embodiment of FIG. 1-5 when a respective eccentrical element lever segment 38, 39 is positioned in axial direction of the eccentrical element 36 in front and behind the connecting rod bearing eye 12 the eccentrical element 36 is fixated at both eccentrical element lever segments 38, 39, in particular through welding.

In the embodiment of FIGS. 1-5 the two eccentrical element lever segments 38, 39 of the eccentrical element lever 14 are configured as individual elements which are respectively connected with one another at lateral ends through a respective connecting bolt 41, 42. The eccentrical element rods 15, 16 are pivotably linked at the connecting bolt 41, 42, namely in the embodiment of FIG. 2 through FIG. 5, forming a hinge link between the eccentrical element rods 15, 16 and the connecting bolts 41, 42 connecting the two eccentrical element lever segments 38, 39.

Figure 6:
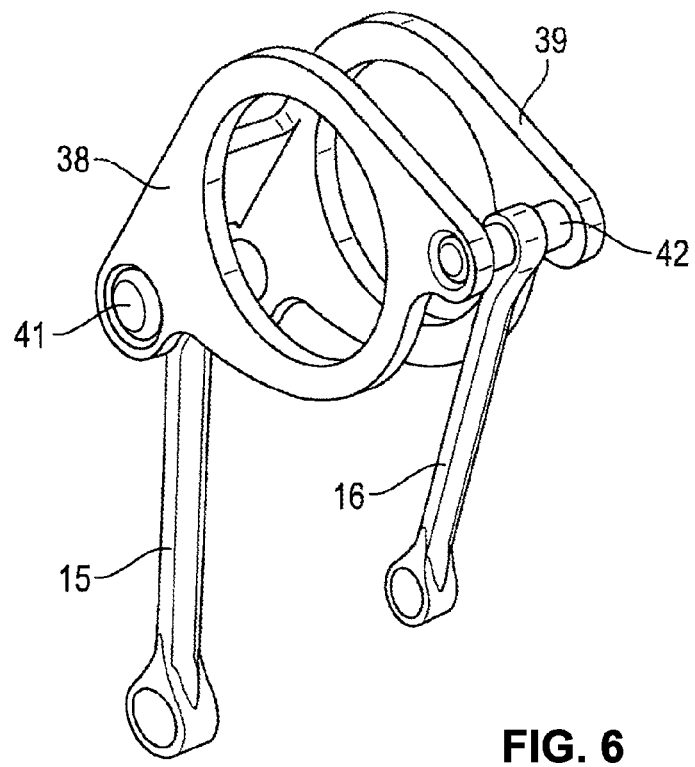
FIG. 6 illustrates an alternative to the detail of FIG. 2.
Figure 7:
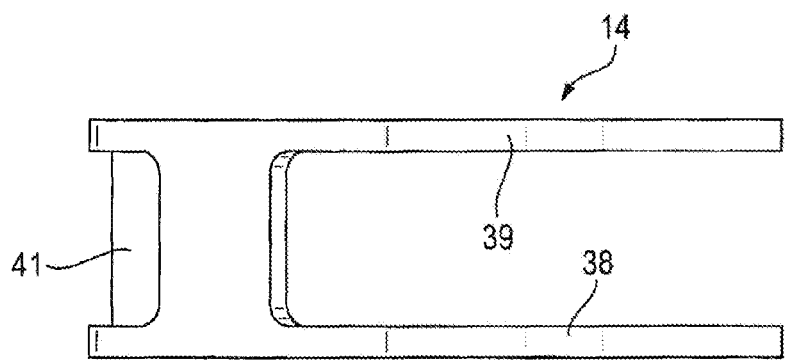
FIG. 7 illustrates sub assemblies of FIG. 6 in a top view.

FIGS. 6 and 7 illustrate an embodiment of the invention in which the eccentrical element lever 14 is configured as a one piece or monolithic component in which accordingly the two eccentrical element lever segments 38, 39 of the eccentrical element lever are configured in one piece or monolithic. The eccentrical element rods 15, 16 are pivotably linked at ends of the one piece or monolithic eccentrical element lever 14, namely in turn through connecting bolts 41, 42 where the eccentrical element rods 15, 16 are linked through a hinge.

Figure 9:
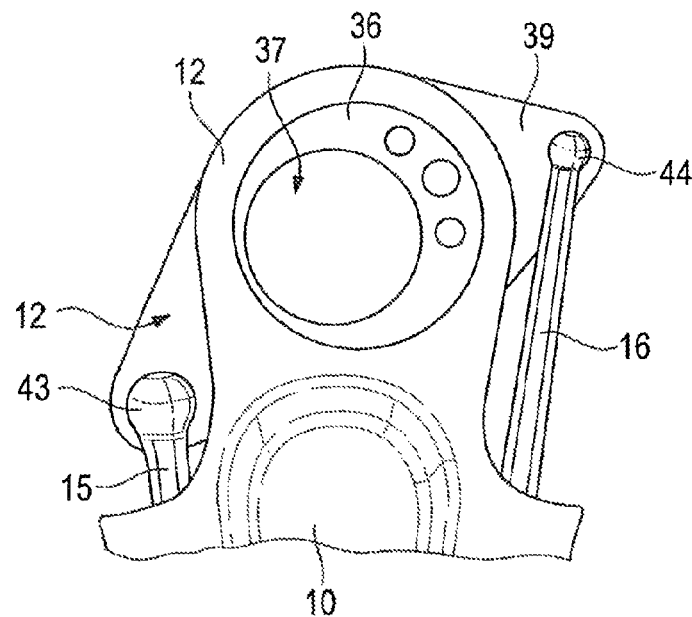
FIG. 9 illustrates another alternative of the detail of FIG. 2.
Figure 10:
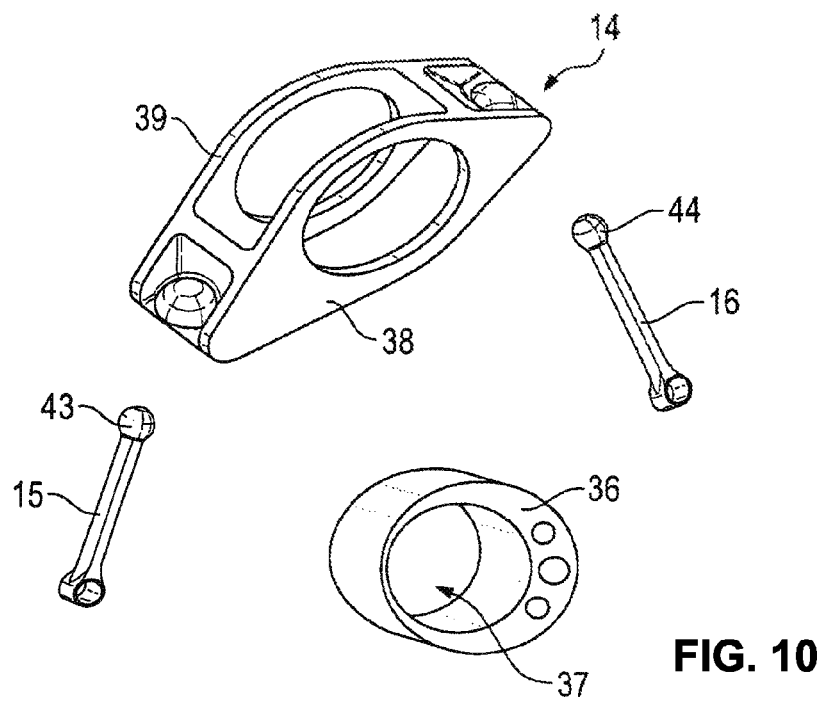
FIG. 10 illustrates sub assemblies of FIG. 9 in an exploded view.

Another embodiment of the invention with a one piece or monolithic eccentrical element lever 14 is illustrated in FIGS. 9 and 10, wherein the two eccentrical element rods 15, 16 engage the opposite ends of the eccentrical element lever 14 through ball joints 43, 44.

Figure 11:
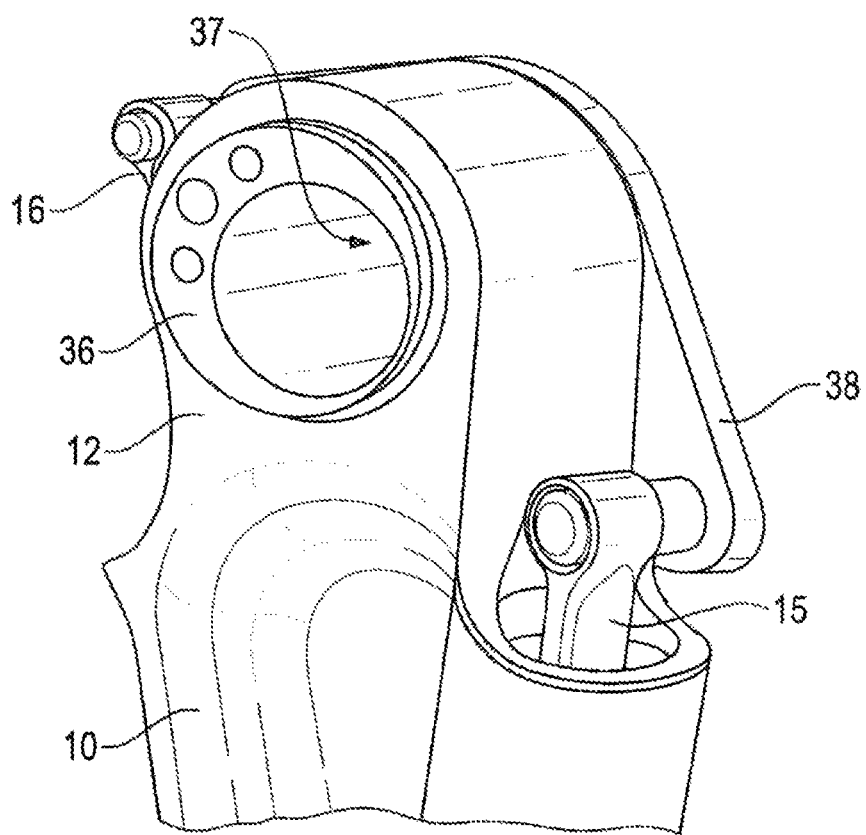
FIG. 11 illustrates another alternative of the detail of FIG. 2.

FIG. 11 illustrates an embodiment of the invention in which the eccentrical element lever 14 exclusively includes an eccentrical element lever segment 38 which is positioned at one side of the connecting rod eye 12 in axial direction of the eccentrical element 36 in front or behind the connecting rod bearing eye 12. In turn the eccentrical element 36 is fixated in the portion of the eccentrical element lever segment 39 at the eccentrical element lever segment 38 in particular through welding.

The eccentrical element 36 is inserted into bore holes of the eccentrical element lever segments 38, 39 and into a bore hole in the connecting rod bearing eye 12 and penetrates these bore holes. This in turn can be derived best from FIG. 8 wherein the detail of FIG. 8 can be used in each of the variants described supra. It can be furthermore derived from FIG. 8 that the eccentrical element 14 is connected with both eccentrical element lever segments 38, 39 in a connecting portion 40 which is advantageously configured as a circumferential weld.

In order to provide a defined position of the eccentrical element 36 in the bore holes of the connecting rod bearing eye 12 and the eccentrical element lever segments 38, 39 the eccentrical element 36 has a contour with shoulders which includes a shoulder 45. This shoulder 45 forms a stop which contacts an outer contour of the connecting rod bearing eye 12 and thus defines a relative position of the eccentrical element 36 relative to the eccentrical element lever 14 and thus relative to the connecting rod eye 12.

Figure 8:
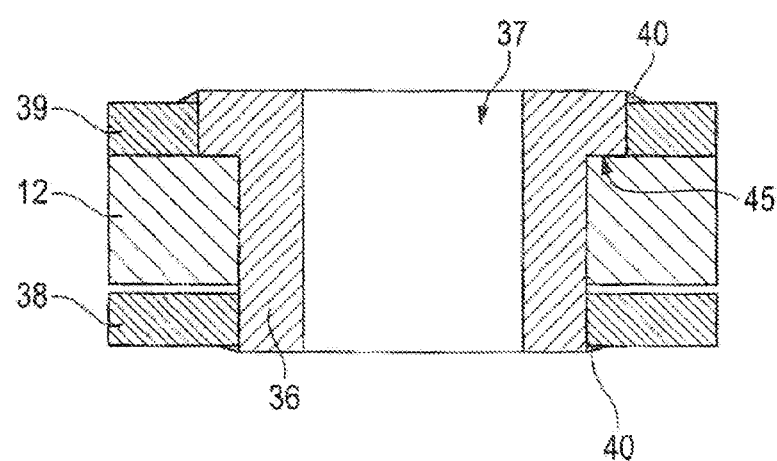
FIG. 8 illustrates another detail of the combustion engine according to the invention.

As can be derived from FIG. 8 the eccentrical element lever segment 39 has a larger bore hole than the eccentrical element lever segment 38, wherein inner diameters of these bore holes are adapted to an outer diameter of the contour with shoulders of the eccentrical element 36.

The invention facilitates simple assembly and fabrication of a connecting rod 10 of an internal combustion engine with adjustable engine ratio.

The eccentrical element 36 is fixated at the eccentrical element lever 14 through welding which provides advantageous torque transmission and reduces wear propensity.

The eccentrical element lever 14 is not inserted anymore into a slot shaped recess in the connecting rod 10, rather the eccentrical element lever segment 38, 39 or each eccentrical element lever segment of the eccentrical element lever 14 is positioned in axial direction of the eccentrical element 36 in front or behind the connecting rod 10, so that after inserting the eccentrical element 36 into the eccentrical element lever 14 and into the connecting rod 10 the eccentrical element 36 can be fixated at the eccentrical element lever 14 in particular through welding.

What is claimed is:

1. An internal combustion engine with adjustable compression ratio with at least one cylinder and with a crank shaft at which at least one connecting rod engages,
   wherein at least one connecting rod includes a crank bearing eye for connecting to a crank shaft, a connecting rod bearing eye connecting to a piston of at least one cylinder and an eccentrical element adjustment device adjusting an effective connecting rod length,
   wherein the eccentrical element adjustment device includes an eccentrical element cooperating with an eccentrical element lever and eccentrical element rods engaging the eccentrical element lever,
   wherein the eccentrical element rods are loaded with a force generated by a hydraulic pressure in hydraulic cavities,
   wherein the eccentrical element lever includes at least one eccentrical element lever segment,
   wherein the at least one eccentrical element lever segment is positioned in an axial direction of the eccentrical element in front or behind a plane of symmetry of the piston,
   wherein the at least one eccentrical element lever segment is fixated at the eccentrical element, and
   wherein the plane of symmetry of the piston is orthogonal to the axial direction of the eccentrical element.

2. The internal combustion engine according to claim 1, wherein the eccentrical element has an exterior contour with a shoulder, and
   wherein the shoulder limits an insertion depth of the eccentrical element into the eccentrical element lever.

3. The internal combustion engine according to claim 1, wherein the at least one eccentrical element lever segment of the eccentrical element lever is welded together with the eccentrical element.

4. A connecting rod with an eccentrical element adjustment device for adjusting an effective connecting rod length,
   wherein an eccentrical element adjustment device includes an eccentrical element cooperating with an eccentrical element lever and eccentrical element rods engaging the eccentrical element lever,
wherein the eccentrical element lever includes at least one eccentrical element lever segment,
wherein the at least one eccentrical element lever segment is positioned in an axial direction of the eccentrical element in front or behind a plane of symmetry of a piston of an internal combustion engine,
wherein the at least one eccentrical element lever segment is fixated at the eccentrical element, and
wherein the plane of symmetry of the piston is orthogonal to the axial direction of the eccentrical element.

5. The internal combustion engine according to claim 1, wherein the at least one eccentrical element lever segment of the eccentrical element lever is welded together with the eccentrical element.

6. The connecting rod according to claim 4,
wherein the eccentrical element has an exterior contour with a shoulder, and
wherein the shoulder limits an insertion depth of the eccentrical element into the eccentrical element lever.

7. The connecting rod according to claim 4,
wherein the at least one eccentrical element lever segment of the eccentrical element lever is welded together with the eccentrical element.

8. The connecting rod according to claim 4,
wherein the eccentrical element has an exterior contour with a shoulder, and
wherein the shoulder limits an insertion depth of the eccentrical element into the eccentrical element lever.

9. The connecting rod according to claim 4,
wherein the at least one eccentrical element lever segment of the eccentrical element lever is welded together with the eccentrical element.

10. An internal combustion engine with adjustable compression ratio with at least one cylinder and with a crank shaft at which at least one connecting rod engages,
wherein at least one connecting rod includes a crank bearing eye for connecting to a crank shaft, a connecting rod bearing eye connecting to a piston of at least one cylinder and an eccentrical element adjustment device adjusting an effective connecting rod length,
wherein the eccentrical element adjustment device includes an eccentrical element cooperating with an eccentrical element lever and eccentrical element rods engaging the eccentrical element lever,
wherein the eccentrical element rods are loaded with a force generated by a hydraulic pressure in hydraulic cavities,
wherein the eccentrical element lever includes at least one eccentrical element lever segment,
wherein the at least one eccentrical element lever segment is positioned in axial direction of the eccentrical element in front and behind a plane of symmetry of the piston,
wherein the at least one eccentrical element lever segment is fixated at the eccentrical element, and
wherein the plane of symmetry of the piston is orthogonal to the axial direction of the eccentrical element.

11. The internal combustion engine according to claim 10,
wherein the eccentrical element lever includes two eccentrical element lever segments, and
wherein a first eccentrical element lever segment is positioned in axial direction of the eccentrical element in front of the connecting rod eye and a second eccentrical element lever segment is positioned in axial direction of the eccentrical element behind the connecting rod bearing eye so that the connecting rod bearing eye is positioned between the two eccentrical element lever segments.

12. The internal combustion engine according to claim 11, wherein the two eccentrical element lever segments are configured as individual components and connected through connecting bolts at which the eccentrical element rods are pivotably linked.

13. The internal combustion engine according to claim 11, wherein the two eccentrical element lever segments are provided by a one piece or monolithic eccentrical element lever at which the eccentrical element rods are pivotably linked.

14. The internal combustion engine according to claim 11,
wherein the eccentrical element has an exterior contour with a shoulder, and
wherein the shoulder limits an insertion depth of the eccentrical element into the eccentrical element lever.

15. A connecting rod with an eccentrical element adjustment device for adjusting an effective connecting rod length,
wherein an eccentrical element adjustment device includes an eccentrical element cooperating with an eccentrical element lever and eccentrical element rods engaging the eccentrical element lever,
wherein the eccentrical element lever includes at least one eccentrical element lever segment,
wherein the at least one eccentrical element lever segment is positioned in axial direction of the eccentrical element in front and behind a plane of symmetry of the piston,
wherein the at least one eccentrical element lever segment is fixated at the eccentrical element, and
wherein the plane of symmetry of the piston is orthogonal to the axial direction of the eccentrical element.

16. The connecting rod according to claim 15,
wherein the eccentrical element lever includes two eccentrical element lever segments, and
wherein a first eccentrical element lever segment is positioned in axial direction of the eccentrical element in front of the connecting rod eye and a second eccentrical element lever segment is positioned in axial direction of the eccentrical element behind the connecting rod bearing eye so that the connecting rod bearing eye is positioned between the two eccentrical element lever segments.

17. The connecting rod according to claim 16, wherein the two eccentrical element lever segments are provided by a one piece or monolithic eccentrical element lever at which the eccentrical element rods are pivotably linked.

* * * * *